United States Patent
Schoubye

[11] Patent Number: 6,074,619
[45] Date of Patent: Jun. 13, 2000

[54] PROCESS FOR SELECTIVE REDUCTION OF NOX IN EXHAUST GAS

[75] Inventor: Peter Schoubye, Vedbæk, Denmark

[73] Assignee: Haldor Topsoe A/S, Lyngby, Denmark

[21] Appl. No.: 09/038,956

[22] Filed: Mar. 12, 1998

Related U.S. Application Data

[60] Provisional application No. 60/040,551, Mar. 13, 1997.

[51] Int. Cl.[7] .................................................. C01B 21/00
[52] U.S. Cl. .................................... 423/239.1; 423/213.2; 423/235
[58] Field of Search ............................... 423/213.2, 235, 423/239.1; 366/337, 340

[56] References Cited

U.S. PATENT DOCUMENTS

| | | | |
|---|---|---|---|
| 5,320,428 | 6/1994 | Streiff | 366/337 |
| 5,431,893 | 7/1995 | Hug et al. | 423/235 |

*Primary Examiner*—Steven P. Griffin
*Assistant Examiner*—Maribel Medina
*Attorney, Agent, or Firm*—Ostrolenk, Faber, Gerb & Soffen, LLP

[57] ABSTRACT

A process for selective catalytic reduction of NOx in exhaust gases at temperatures of 200–600° C. A spray of droplets containing a reductant is injected into a duct through an atomizing nozzle and into an exhaust gas. The exhaust gas, loaded with the spray droplets, is passed through the spaces between the plates of a series of stacks of parallel plates. The plates of each stack in the series are positioned at an angle relative to the walls of the gas duct and any adjacent stack, forcing the exhaust gas to pass through the stacks in a zig-zag flow pattern. After passing through the last stack, the exhaust gas then passes through a layer of monolithic catalyst for selective reduction of NOx by $NH_3$ with channels parallel to the walls of the duct. Substantially all the spray droplets impinge on the walls of the plates, and the diameter of the droplets are larger than the critical diameter at which they are caused to touch the walls each time the direction of gas-flow is deflected upon passing through the stacks.

10 Claims, 3 Drawing Sheets

PROCESS FOR SELECTIVE REDUCTION OF NOX IN EXHAUST GAS

This application claims the benefit of U.S. Provisional Application Ser. No. 60/040,551, filed Mar. 13, 1997.

BACKGROUND OF THE INVENTION

1. Field of the Invention

The present invention relates to selective reduction of NOx, typically contained in exhaust gas from diesel engines, by $NH_3$ that is generated by decomposition of chemicals such as urea, solutions of urea in water or solutions of $NH_3$ in water. The $NH_3$ is generated in the gas phase upstream of the so-called SCR catalyst for the selective reduction of NOx.

2. Description of the Related Art

The chemical used as reductant is injected in liquid form as a spray, generated in a spray nozzle, into the exhaust gas stream having a temperature of typically 300–400° C. as required for the catalytic NOx reduction process. The droplets must, however, be evaporated and urea decomposed into $NH_3$, $CO_2$ and $H_2O$ before the $NH_3$ can be utilized in the SCR catalyst for the NOx-reduction process. Evaporation and decomposition of the droplets is strongly endothermal.

The rate of evaporation and decomposition (gasification) of the droplets is limited by the rate at which heat is transferred from the hot gas to the surface of the droplets through the gas film surrounding the droplets. This means that the time for gasifying a droplet (the residence time) can be estimated by the equation:

$$t = K \times d^{-2} \times (T - T_{min}) \text{ seconds}$$

where d is the (initial) diameter of the droplet, T is the temperature of the gas, and $T_{min}$ is the minimum temperature required for decomposition of the urea at an appropriate rate (i.e., about 180° C.), while K is a constant that is nearly independent of the gas velocity.

Thus, the residence time of the droplets increases strongly with the size of the droplets.

The distance between the injection nozzle and the SCR catalyst required for achieving complete gasification of the droplets in the gas stream, furthermore, increases proportionally to the gas velocity in the duct.

It is estimated from experiments and calculations that a residence time of 100 μm droplets of a 35% solution of urea in exhaust gas at 300° C. is on the order of 1 second, which means that a distance of 20 m from the nozzle to the SCR catalyst is required for complete gasification of the droplets at 20 m/s gas velocity in the duct.

On the other hand, if only 0.5 m distance from injection nozzle to the SCR catalyst is available (as in the case of diesel vehicles), it is necessary to reduce the size of the droplets to less than 8 μm in order to achieve complete gasification of the droplets in the gas phase upstream of the SCR catalyst. Such a size reduction is very difficult to achieve. Moreover, without such a reduction, most of the particles or droplets in the gas will pass unreacted through the SCR catalyst when the catalyst is monolithic with straight channels throughout the catalytic block.

It has surprisingly been found that relatively large droplets of reductant generated by a simple spray nozzle can be quickly and completely gasified if the droplets are caused to impinge on surfaces in a device that can easily be installed in the limited distance available between the nozzle and the SCR catalyst in, e.g., a diesel vehicle.

SUMMARY OF THE INVENTION

The present invention provides a process for selective catalytic reduction of NOx in exhaust gases at temperatures of about 200–600°C. The process includes injecting a spray of droplets containing a reductant into a duct through an atomizing nozzle and into an exhaust gas. The exhaust gas loaded with droplets is passed through the spaces between the stacks of parallel plates. The plates of the first stack are positioned at an angle of typically about 45° relative to the walls of the gas duct. The plates of the next stack are positioned at an angle of substantially 90° relative to the plates of the first stack and substantially 45° relative to the walls of the duct. The third stack has plates parallel to the plates of the first stack, and so on, whereby the gas is forced to pass through the stacks in a zig-zag flow pattern.

After the last stack, the gas is passed through a layer of monolithic catalyst for selective reduction of NOx by $NH_3$ with channels parallel to the walls of the duct.

Preferably, practically all the droplets impinge on the walls of the plates, the diameter of the droplets being generated to be larger than the critical diameter at which the droplets are caused to touch the walls when the direction of gas-flow is deflected upon passing through the stacks. According to a preferred method, the droplets are larger than 30 μm, the number of stacks composed of parallel plates is 1–10, the gas velocity in the spaces between the plates is 2–30 m/s, the distance between the plates is 3–50 mm, the length of each of the plates is 1–5 times the distance between the plates, and the angle between the plates of two neighboring stacks is 50–140°. Alternative embodiments encompassed by the invention include features similar to those of the preferred embodiment, using approximate values within and outside the ranges noted above for some or all of the features.

The plates preferably are made of metal, preferably an acid resistant stainless steel alloy, or ceramic material, preferably cordierite. Alternatively, the plates can be coated, at least on the surface exposed to the impinging droplets, with a protective layer, such as by an approximately 0.01–1 mm layer of at least one of the oxides of Al, Fe, Ti, Zr, Si, Zn or Mg, for example. Various reductants can be used, the preferred reductant being a liquid mixture of urea and water, most preferably with about 30–100 weight % urea.

Other features and advantages of the present invention will become apparent from the following description of the invention which refers to the accompanying drawings.

DETAILED DESCRIPTION OF THE PREFERRED EMBODIMENTS

Figure 1:
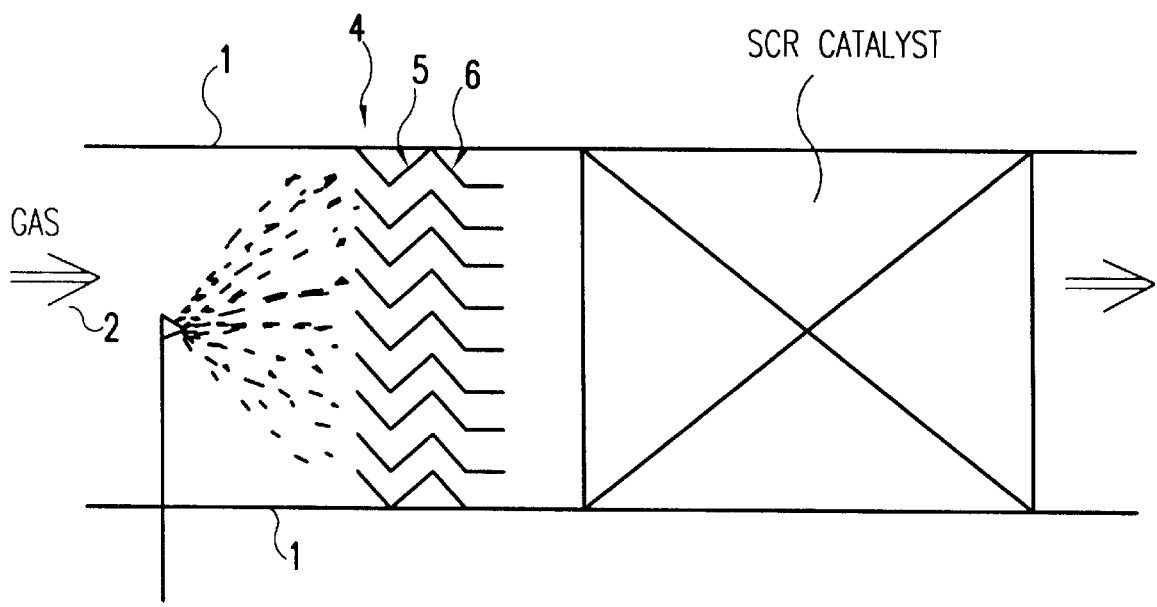
FIG. 1 is a schematic view of a gasification device according to the present invention.

The device is shown in principle in FIG. 1. It includes a number of consecutive stacks 4 arranged in a gas duct 1, each stack consisting of parallel plates 5, 6 that cause the gas 2 to flow in a zig-zag pattern in the spaces between the plates from stack to stack, whereby the droplets tend to impinge on the surface of the plates each time the direction of flow is changed. When the droplets impinge, they splatter onto the surface of the plates, whereby the liquid is heated at a much higher rate than in the form of droplets in the gas phase due to the now increased surface area of the liquid directly exposed to the heat, and because the solid material of the plates which have been heated by the gas provide a much more means of conductive heat transfer than by the gas. Hence, the plates extend the surface of heat transmission between liquid and gas, and the gas film restriction for heat transfer between the stagnant plates and the gas is much higher than that of droplets moving passively along with the gas flow.

Figure 2:
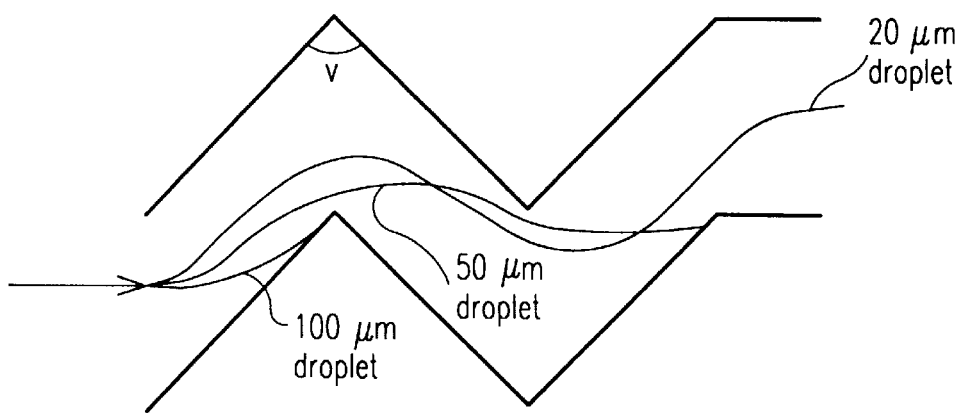
FIG. 2 is a schematic view of calculated droplet trajectories of gas passing through stacks of plates according to the present invention.

The tendency for droplets to impinge on the plates of a stack increases upon increasing the size of the droplets, upon increasing the gas velocity in the space between the plates, with increasing the angle of deflection of the gas stream when passing from stack to stack, to some extent with upon increasing the length of the plates in the direction of flow and upon decreasing the distance between the plates in a stack. This is visualized in FIG. 2 showing calculated trajectories of 20, 50 and 100 $\mu$m droplets in gas passing through 3 stacks of plates with a distance of 10 mm between the plates and 90° angle of deflection of the gas passing from stack to stack and a gas velocity of 8 m/s in the spaces between the stacks. It is seen that the 100 $\mu$m droplets impinge in the first stack, and the 50 $\mu$m droplet impinges at the third stack, while the 20 $\mu$m droplet passes through all three stacks.

Figure 3:
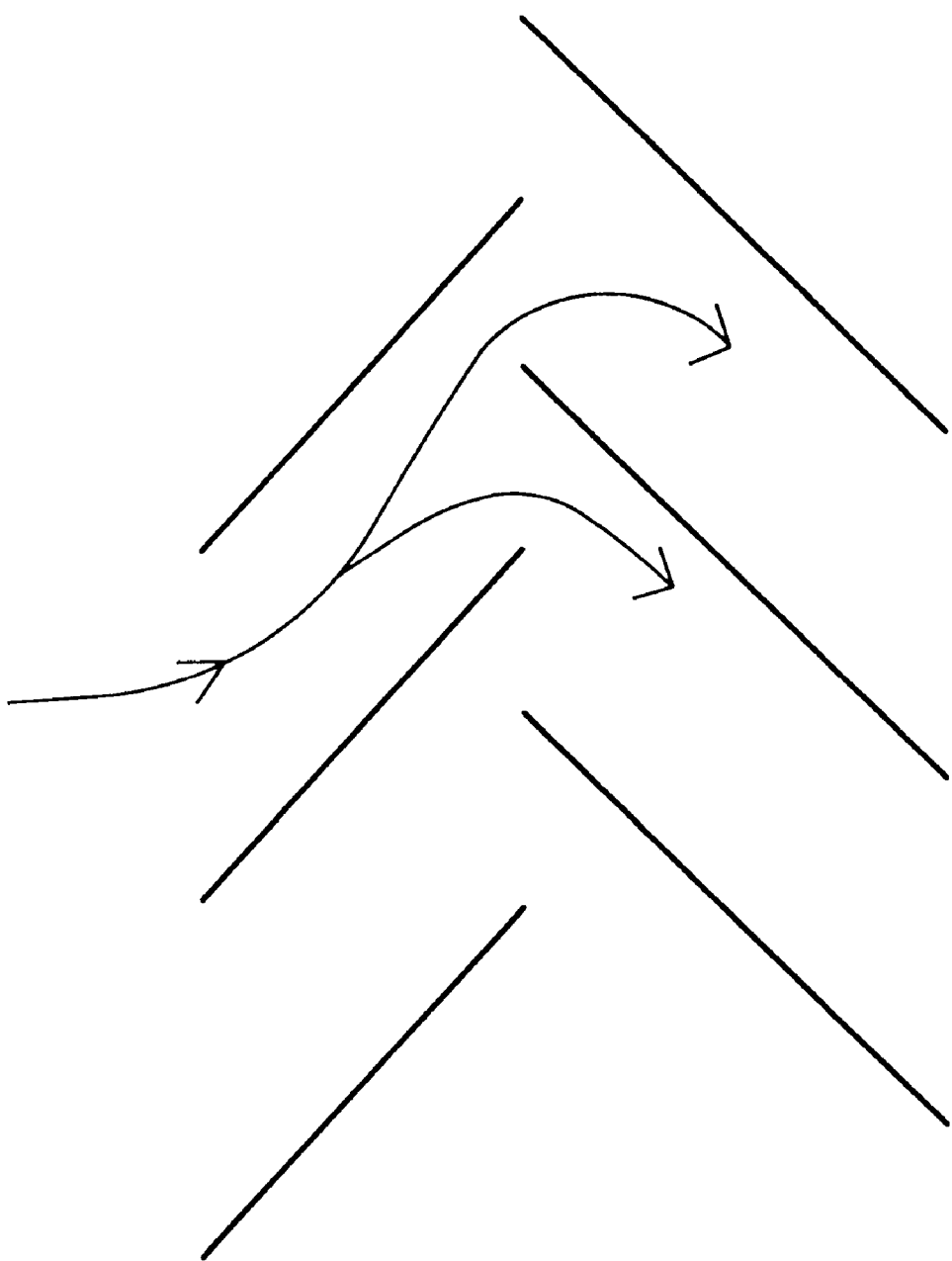
FIG. 3 is a schematic view of an alternative embodiment of plate stacks according to the present invention.

The efficiency of impingement will increase when the plate positions in one stack are displaced from the position of the plates in the next stack so that the spaces between the plates are reduced by about half where the gas passes to the next stack, as shown in FIG. 3.

The rate of gasification and, in particular, the minimum temperature of the gas required for obtaining complete gasification of the reductant can be increased and decreased, respectively, by coating the surfaces of the plates, or least the areas of impingement of the plates, with materials such as oxides of Al, Fe, Ti, Zr, Si, Zn and/or Mg which catalyze the decomposition of urea.

Furthermore, increased mixing of the gas across the duct can be achieved by cutting and displacing the plates.

Impingement and mixing of the gas can also be combined by staggering the plates in ways similar to those used in known types of stationary mixers. The impingement effect will, however, be decreased when combined with mixing of the gas because the bypass of gas from channel to channel between the plates, which, at a given mixing effect, decreases the deflection of the gas.

Figure 4:
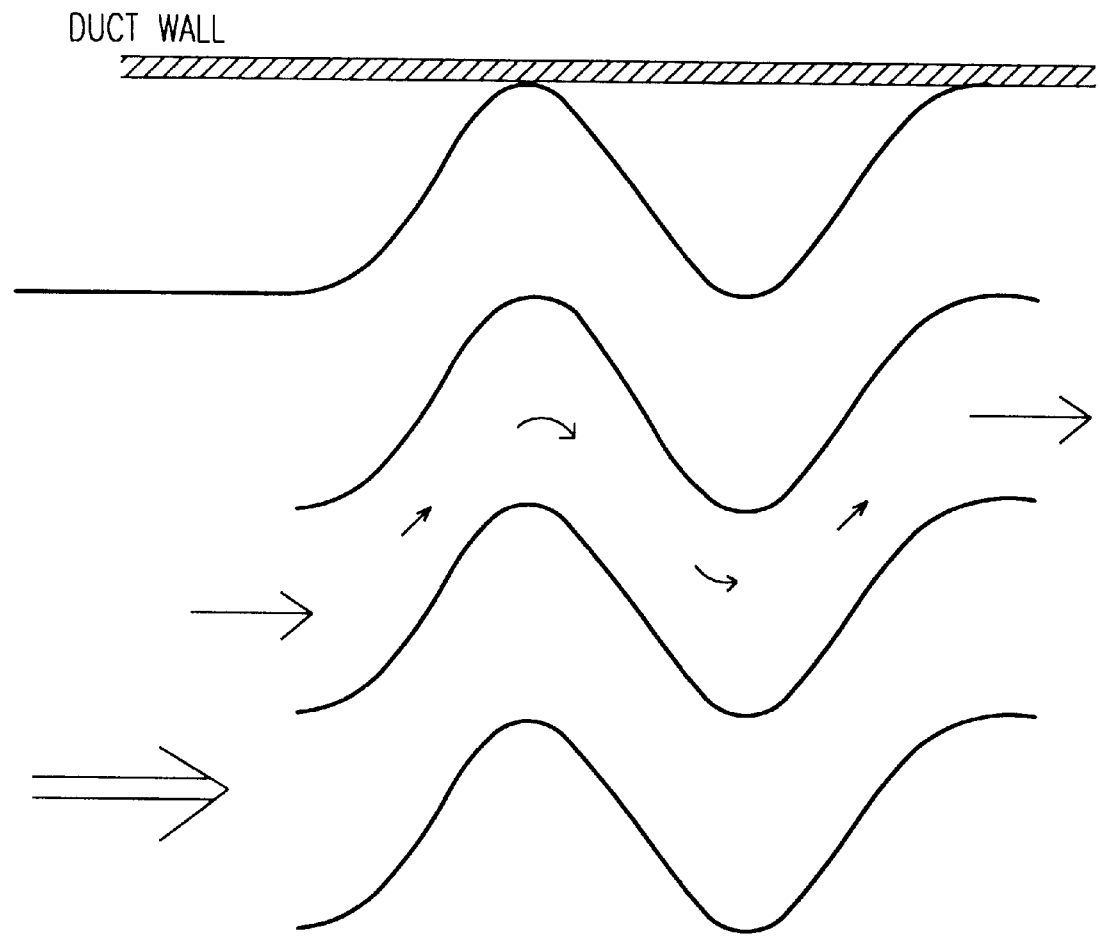
FIG. 4 is a schematic view of gas flow channels according to an alternative embodiment of the present invention.

Instead of sharp edged channels formed by stacks of flat plates as shown in FIG. 1, the channels for gas flow can, alternatively, be formed as shown in FIG. 4 by piling wave-shaped plates with the waves perpendicular to the walls of the duct. The gas flow in the channels formed by the spaces between the wave-shaped plates will be deflected in principle in a manner similar to that of sharp-edged channels formed by spaces between the above-described array of flat plates shown in FIG. 1.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. Process for selective catalytic reduction of NOx in exhaust gases at temperatures of 200–600° C., the process comprising the steps of:

a) injecting a spray of droplets containing a reductant into a duct through an atomizing nozzle and into an exhaust gas;

b) passing the exhaust gas loaded with the spray droplets through spaces between plates of a series of stacks of parallel plates, the plates of each stack in the series being positioned at an angle relative to the walls of the gas duct and adjacent stacks, whereby the gas is forced to pass through the stacks in a zig-zag flow pattern and wherein substantially all the spray droplets impinge on the walls of the plates, the diameter of the droplets being larger than a critical diameter at which the droplets are caused to touch the walls when the direction of gas-flow is deflected upon passing through the stacks; and c) passing the exhaust gas, after the last stack, through a layer of monolithic catalyst for selective reduction of NOx by $NH_3$ with channels parallel to the walls of the duct.

2. Process as claimed in claim 1, wherein the droplets are larger than 30 $\mu$m, the number of stacks composed of parallel plates is from about 1 to about 10, the gas velocity in the spaces between the plates is in the range of about 2 to about 30 m/s, the distance between the plates is from about 3 to about 50 mm, the length of each of the plates is about 1 to about 5 times the distance between the plates, and the angle between the plates of two neighboring stacks is about 50° to about 140°.

3. Process as claimed in claim 1, wherein the plates are made of metal.

4. Process as claimed in claim 3, wherein the metal is an acid resistant stainless steel alloy.

5. Process as claimed in claim 1, wherein the plates are made of a ceramic material.

6. Process as claimed in claim 5, wherein the ceramic material is cordierite.

7. Process as claimed in claim 1, wherein the plates are coated with a reductant-decomposition catalyst, at least on the surface exposed to the impinging droplets.

8. Process as claimed in claim 1, wherein the plates are coated by a 0.01–1 mm layer of at least one of the oxides of Al, Fe, Ti, Zr, Si, Zn or Mg.

9. Process as claimed in claim 1, wherein the reductant is a liquid mixture of urea and water.

10. Process as claimed in claim 9, wherein the liquid mixture is about 30–100 weight % urea.

* * * * *